United States Patent
Zeng et al.

(10) Patent No.: US 10,903,477 B2
(45) Date of Patent: Jan. 26, 2021

(54) OUTPUT ELECTRODE PLATE AND BATTERY MODULE

(71) Applicant: Contemporary Amperex Technology Co., Limited, Ningde (CN)

(72) Inventors: Xin Zeng, Ningde (CN); Sien Chen, Ningde (CN); Kaiqin Yu, Ningde (CN); Wei Wang, Ningde (CN); Shoujiang Xu, Ningde (CN); Chunyan Feng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 176 days.

(21) Appl. No.: 16/115,556

(22) Filed: Aug. 29, 2018

(65) Prior Publication Data

US 2019/0393476 A1 Dec. 26, 2019

(30) Foreign Application Priority Data

Jun. 20, 2018 (CN) .......................... 2018 1 0636713

(51) Int. Cl.
*H01M 2/34* (2006.01)
*H01M 2/26* (2006.01)
(Continued)

(52) U.S. Cl.
CPC ......... *H01M 2/348* (2013.01); *H01M 2/1061* (2013.01); *H01M 2/1077* (2013.01);
(Continued)

(58) Field of Classification Search
CPC ........ H01M 2/348; H01M 2/26; H01M 2/266; H01M 2/1061; H01M 2/1077;
(Continued)

(56) References Cited

U.S. PATENT DOCUMENTS

| 2005/0146825 A1 | 7/2005 | Kaszeta et al. |
| 2006/0194101 A1 | 8/2006 | Ha et al. |

(Continued)

FOREIGN PATENT DOCUMENTS

| CN | 103650209 B | 8/2016 |
| CN | 107408658 A | 11/2017 |

(Continued)

OTHER PUBLICATIONS

The extended European Search Report for European Application No. 18191807.9, dated Apr. 18, 2019, 12 pages.

*Primary Examiner* — Gregg Cantelmo

(74) *Attorney, Agent, or Firm* — Law Offices of Liaoteng Wang

(57) ABSTRACT

The disclosure relates to an output electrode plate and a battery module. The output electrode plate comprises a first metal plate. The first metal plate includes a first region and a second region in a first direction. The first region includes a first overcurrent portion and a second overcurrent portion in a second direction. The second region is connected to the first region. The first overcurrent portion is provided with a through hole which extends in a thickness direction thereof, and a projection of the through hole along the first direction does not exceed a projection of the second region along the first direction in the second direction, and the first metal plate is formed with a minimum overcurrent section at the through hole, such that the minimum overcurrent section is first fused when a current flowing through the first metal plate is greater than a preset current.

20 Claims, 7 Drawing Sheets

(51) Int. Cl.
*H01M 2/10* (2006.01)
*H01M 2/20* (2006.01)

(52) U.S. Cl.
CPC .............. *H01M 2/206* (2013.01); *H01M 2/26* (2013.01); *H01M 2/34* (2013.01); *H01M 2200/103* (2013.01); *H01M 2220/20* (2013.01); *Y02E 60/10* (2013.01)

(58) Field of Classification Search
CPC .. H01M 2/206; H01M 2/34; H01M 2200/103; H01M 2220/20; Y02E 60/10
See application file for complete search history.

(56) References Cited

U.S. PATENT DOCUMENTS

| | | | | |
|---|---|---|---|---|
| 2011/0244281 A1* | 10/2011 | Byun | ................... | H01M 2/266 |
| | | | | 429/62 |
| 2011/0300419 A1* | 12/2011 | Byun | ..................... | H01M 2/22 |
| | | | | 429/61 |

FOREIGN PATENT DOCUMENTS

| | | | | |
|---|---|---|---|---|
| EP | 2538468 A1 | 12/2012 | | |
| KR | 20100003146 A | * | 1/2010 | .......... H01M 10/482 |
| KR | 20170117815 A | | 10/2017 | |
| KR | 101864290 B1 | | 6/2018 | |

\* cited by examiner

OUTPUT ELECTRODE PLATE AND BATTERY MODULE

CROSS-REFERENCE TO RELATED APPLICATION

This application is based upon and claims priority to Chinese Patent Application No. 201810636713.5 filed on Jun. 20, 2018, the content of which is incorporated herein by reference in its entirety.

TECHNICAL FIELD

The present disclosure relates to the technical field of the battery, and in particular, to an output electrode plate and a battery module.

BACKGROUND

Recently, the market and technology development of the electric vehicle attracts much attention, and becomes more and more competitive, particularly, the reliable and safe operation and the high cost performance of the vehicle have become the pronouns for the core competitiveness of the electric vehicle industry. The power battery system is the assembly which is most directly relevant to the two parts of the electric vehicle. Therefore, the current core challenge is to solve the safety and low-cost problem of the power battery system.

In the prior art, the two following aspects are generally included to solve the safety problem and the low-cost problem of the power battery system: one aspect is to design a general safety fuse in the main circuit of the battery package system, acting as overload protection of the whole battery system circuit and the external short-circuit protection of the entire package. The other aspect is for square-case single cell and to provide a safety structure within the single cell level, to ensure the external short-circuit and overcharge safety of the single cell level.

Although the above two aspects may solve the safety problem and low-cost problem of the power battery system to some extent, there are corresponding disadvantages. The main reason is that there is no corresponding safety structure at the module level that can ensure the external short-circuit safety protection at the module level. During the assembly manufacture process, the final assembly process for battery package and the later maintenance stage, the external short-circuit manufacture at the module level may be caused due to human error, or when the whole vehicle is running, the external short-circuit manufacture at the module level may be caused when the wire harness between the internal module is broken or after the whole vehicle is crushed. The module-level external short-circuits in these two aspects are not covered by the general safety component that is designed in the main circuit of the battery package system. Especially, for the pouch-type module, since the safety structure cannot be designed at the single cell level within the pouch-type single cell like square-case single cell due to the structural space arrangement inside the cell, all the single cells within the module will have no fuse protection once the module formed by the pouch-type single cell is externally short-circuited, which may easily lead to serious safety problems such as thermal runaway or even explosion of the single cells within the module.

SUMMARY

Embodiments of the present disclosure provide an output electrode plate that can satisfy the output and input requirements of the power and can ensure the safety of the battery system at the module level.

An embodiment of the present disclosure provides an output electrode plate for a battery module, the output electrode plate comprises a first metal plate; the first metal plate includes a first region and a second region that are successively distributed in a first direction; the first region includes a first overcurrent portion and a second overcurrent portion, the first overcurrent portion and the second overcurrent portion are successively distributed in a second direction and are connected with each other, wherein the second direction intersects with the first direction, and the second region is connected to the first region through the first overcurrent portion; wherein, the first overcurrent portion is provided with a through hole which extends in a thickness direction thereof, and a projection of the through hole along the first direction does not exceed a projection of the second region along the first direction in the second direction, and a minimum overcurrent section of the first metal plate is formed at the through hole, such that the minimum overcurrent section is first fused when a current flowing through the first metal plate is greater than a preset current.

According to an aspect of the embodiments of the present disclosure, an intersection line where the minimum overcurrent section intersects with an upper surface of the first region in the thickness direction is a first connection line, and an orthographic projection on the upper surface of a connection surface where the first overcurrent portion connects to the second overcurrent portion is a second connection line, wherein the second connection line intersects with the first connection line.

According to an aspect of the embodiments of the present disclosure, an angle M is formed by the first connection line and the second connection line is, wherein $0° < M < 45°$.

According to an aspect of the embodiments of the present disclosure, the first region has a first edge and a second edge that are opposite in the first direction, the second overcurrent portion is provided with a notch which is recessed from the first edge toward the second edge, the second region is connected to the first edge and intersects with the first region, and at least part of a sidewall enclosing the notch flushes with an end surface of the second region in the second direction.

According to an aspect of the embodiments of the present disclosure, the first connection line has a first end point a and a second end point b that are opposite, the first end point a is located on the sidewall of the notch, the second end point b is located on the second edge, and the first connection line passes through the through hole.

According to an aspect of the embodiments of the present disclosure, the first region has a first edge and a second edge that are opposite in the first direction, and the first connection line has a first end point a and a second end point b that are opposite, the first end point a is located on an end surface of the second region in the second direction and is an intersection point of the first connection line and the second connection line, the second end point b is located on the second edge, and the first connection line passes through the through hole.

According to an aspect of the embodiments of the present disclosure, the first connection line has a length L, and the length is determined based on a characteristic parameter of the first metal plate, a time when the preset current flows through the first metal plate, and a preset diameter of the through hole.

According to an aspect of the embodiments of the present disclosure, the characteristic parameter of the first metal plate is determined based on a constant coefficient of the first metal plate, the preset current flowing through the first metal plate, and a thickness of the first region of the first metal plate.

According to an aspect of the embodiments of the present disclosure, the length of the first connection line is determined based on a relation:

$$L \le \frac{IK}{d}\sqrt{t} + \varphi$$

wherein, I is the preset current flowing through the first metal plate, K is the constant coefficient of the first metal plate, d is the thickness of the first region of the first metal plate, and t is the time when the current flows through the first metal plate, φ is the preset diameter of the through hole.

According to an aspect of the embodiments of the present disclosure, the constant coefficient of the first metal plate is obtained based on a metal conductivity, a specific heat capacity, a mass metal density, and a metal melting point of the first metal plate.

According to an aspect of the embodiments of the present disclosure, the constant coefficient of the first metal plate is obtained using the formula:

$$K = \sqrt{\frac{\rho_{conductivity}}{C\rho_{density}A}}$$

wherein, $\rho_{conductivity}$ is the metal conductivity of the first metal plate, C is the specific heat capacity of the first metal plate, and $\rho_{density}$ is the metal mass density of the first metal plate, and A is the metal melting point of the first metal plate.

According to an aspect of the embodiments of the present disclosure, the through hole is provided away from the second region and is offset in the first direction from a center line of the first overcurrent portion in the first direction.

According to an aspect of the embodiments of the present disclosure, the output electrode plate further comprises a second metal plate that is connected to the first metal plate, the second metal plate is provided with a connection port for electrical connection between the battery module.

The output electrode plate according to an embodiment of the disclosure comprises a first metal plate; the first metal plate includes a first region and a second region that are successively distributed in a first direction; the first region includes a first overcurrent portion and a second overcurrent portion, and the first overcurrent portion and the second overcurrent portion are successively distributed in a second direction and are connected with each other, wherein the second direction intersects with the first direction, and the second region is connected to the first region through the first overcurrent portion; the first overcurrent portion is provided with a through hole which extends in a thickness direction thereof. The output electrode plate can be used for the battery module, and when used in the battery module, it may be electrically connected with the single cell in the battery module as a module output, so as to satisfy the input and output requirements of the power of the battery module.

Due to the provision of the through hole in the first overcurrent portion, a minimum overcurrent section of the first metal plate is formed at the through hole, such that the minimum overcurrent section is first fused when the current flowing through the first metal plate is greater than the preset current, so as to ensure the safety of the battery module. Moreover, since the projection of the through hole along the first direction does not exceed the projection of the second region along the first direction in the second direction, the first metal plate may achieve the higher strength and is thus not prone to break while the protection requirement of the battery module is ensured.

According to another aspect of the embodiment of the present disclosure, it provides a battery module, comprising a single cell pack, comprising a plurality of single cells that are electrically connected with each other; and the above mentioned output electrode plate, wherein the output electrode plate is electrically connected to the single cell of the single cell pack which is used as output module.

BRIEF DESCRIPTION OF THE DRAWINGS

Features, advantages, and technical effects of the exemplary embodiments of the present disclosure will be described below with reference to the drawings.

Figure 1:
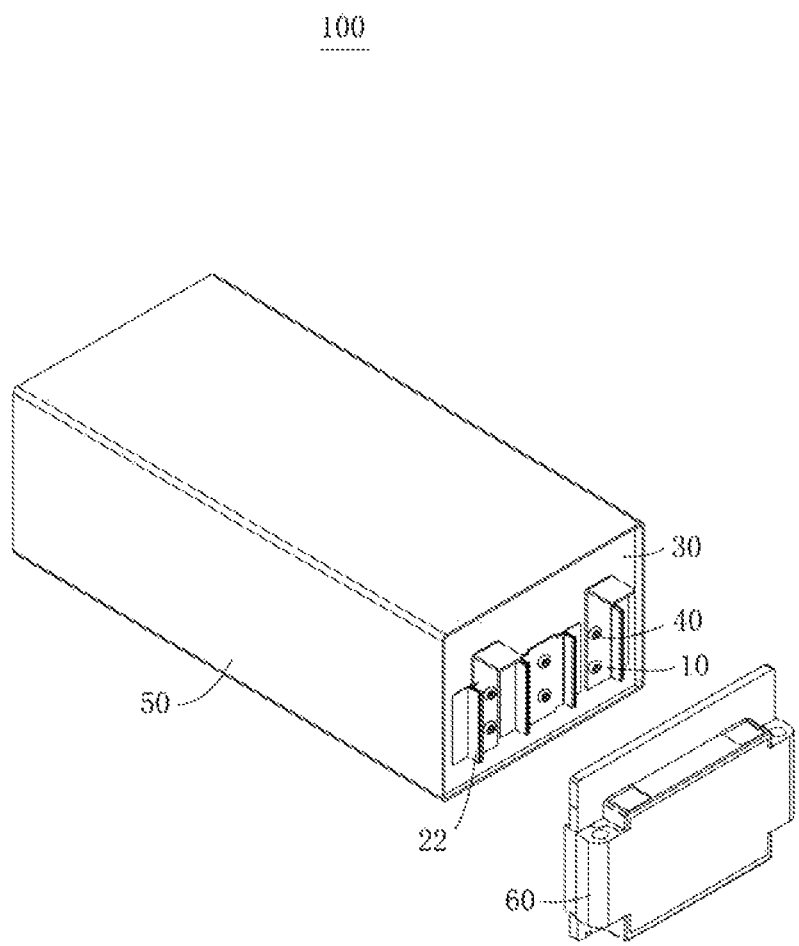
FIG. 1 shows a perspective view of a battery module according to an embodiment of the present disclosure.

wherein:
X-first direction; Y-second direction; Z-thickness direction;
100-battery module;
10-output electrode plate;
11-first metal plate;
111-first region; 111a-first overcurrent portion; 111b-second overcurrent portion; 111c-through hole; 111d-first edge; 111e-second edge; 111f-notch; 111g-limiting through hole;
112-second region; 112a-end face;
113-first connection line;
114-second connection line;
115-center line;
12-second metal plate; 121-connection port;
20-single cell pack; 21-fixing frame; 22-electrode lead;
30-spacer plate assembly;
40-insulated fixing member;
50-case;
60-end plate.

In the drawings, the same components are denoted by the same reference numerals. The drawings are not drawn to scale.

DETAILED DESCRIPTION

Embodiments of the present disclosure will be further described in detail below in conjunction with the drawings and embodiments. The detailed description of the embodiments and the accompanying drawings are intended to illustrate the principle of the disclosure but are not intended to limit the scope of the disclosure, i.e., the present disclosure is not limited to the described embodiments.

In the description of the present disclosure, it should be noted that, unless otherwise stated, the meaning of "several" is one or more; the meaning of "multiple" is two or more; the orientation or positional relationship indicated by the terms "upper", "lower" "left", "right", "inside", "outside", "front end", "back end", "head", "tail" and like is based on the orientation or positional relationship shown in the drawings, which is merely for the convenience of the description of the present disclosure and the simplification of the description, and does not indicate or intend that the involved device or element must have the specific orientation or must be configured or operated in a specific orientation, and therefore, should not to be construed as a limitation to the disclosure. Moreover, the terms "first", "second", "third", and the like are only used for the purpose of description, and should not be construed as indicating or implying relative importance.

The orientation words appearing in the following description refer to the directions shown in the drawings, and are not intended to limit the specific structure of the output electrode plate and the battery module of the present disclosure. In the description of the present disclosure, it should be noted that the terms "mount", "connect with", and "connect to" are to be understood broadly, for example, it may be fixed connection or detachable connection or integral connection; it may be mechanical connection or electrical connection; it may be direct connection or indirect connection through an intermediate medium. The specific meaning of the above terms in the present disclosure may be understood by the skilled in the art based on the specific situation.

In order to understand the present disclosure better, an output electrode plate and a battery module according to an embodiment of the present disclosure will be described in detail below with reference to FIGS. 1 to 7.

Figure 2:
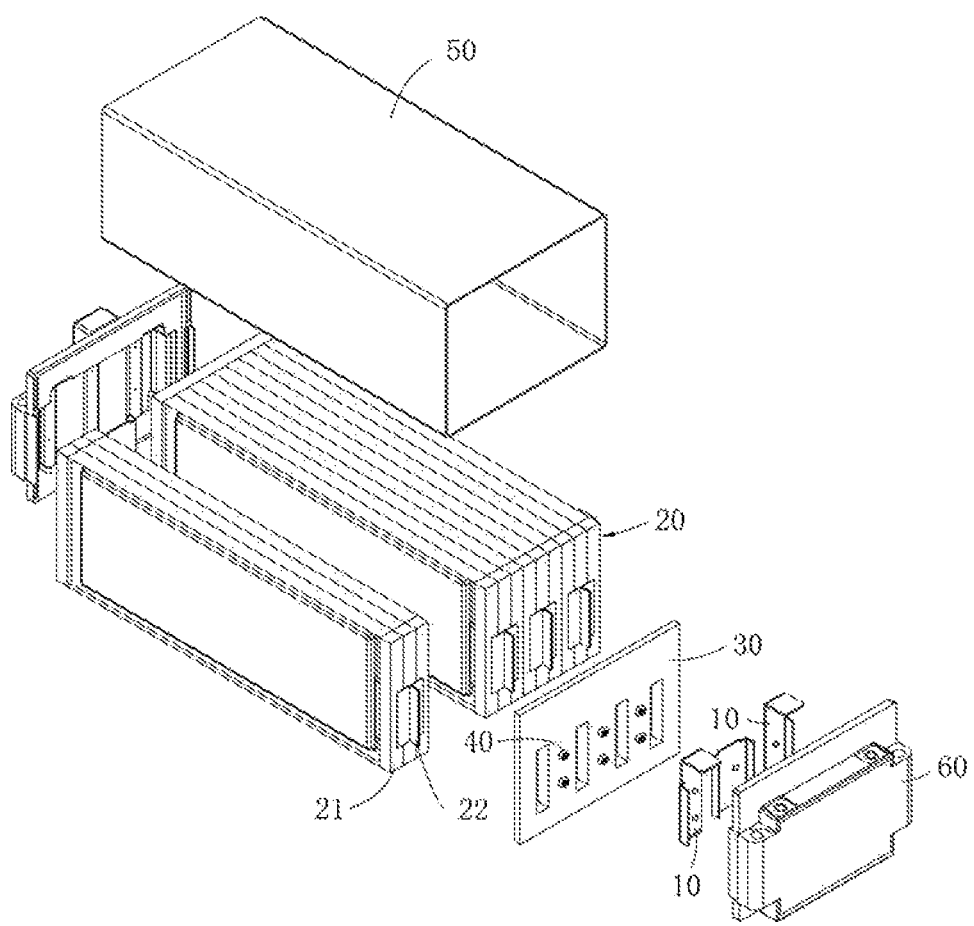
FIG. 2 shows an exploded perspective view of the structure shown in FIG. 1.

FIG. 1 shows a perspective view of a battery module of an embodiment of the present disclosure, and FIG. 2 shows an exploded perspective view of the structure shown in FIG. 1.

As shown in FIGS. 1 and 2, an embodiment of the present disclosure provides a battery module 100, comprising a single cell pack 20 which includes a plurality of single cells that are electrically connected with each other, a spacer plate assembly 30 which is provided on the single cell pack 20, and an output electrode plate 10 which is electrically connected with the single cell in the plurality of single cell pack 20 that is used as module output, so as to satisfy the input and output requirements of the power of the battery module 100. In a specific implementation, the output electrode plate 10 may be provided on the spacer plate assembly 30 and be fixedly connected to the single cell pack 20 through the spacer plate assembly 30.

In one example, the battery module 100 provided in the embodiment of the present disclosure may be a pouch-type battery module 100, and the single cell pack thereof 20 further includes a fixing frame 21, wherein the single cells are connected to the fixing frame 21 and form a cell unit together with the fixing frame 21. The formed cell units are stacked and connected with each other in series or in parallel, thereby achieving mutual electrical connection of the single cells. Since the battery module 100 is the pouch-type battery module 100, accordingly, each of the single cells has an electrode lead 22, and the output electrode plate 10 is specifically electrically connected to the electrode lead 22 of the single cell. In order to ensure the safety of the single cell pack 20 and the output electrode plate 10, the battery module 100 further includes a case 50 and an end plate 60 connected to the case 50.

The battery module 100 provided in the embodiment of the present disclosure may employ different output electrode plate 10, as long as they can satisfy the input and output requirements of the power. Of course, as one alternative implementation, the output electrode plate 10 that is integrated with the safety function is preferable, which may not only satisfy the input and output requirements of the power of the battery module 100, but also enable the battery module 100 to provide protection at its own module level. Therefore, it can protect the single battery pack thereof 20 in the event of an external short circuit.

Figure 3:
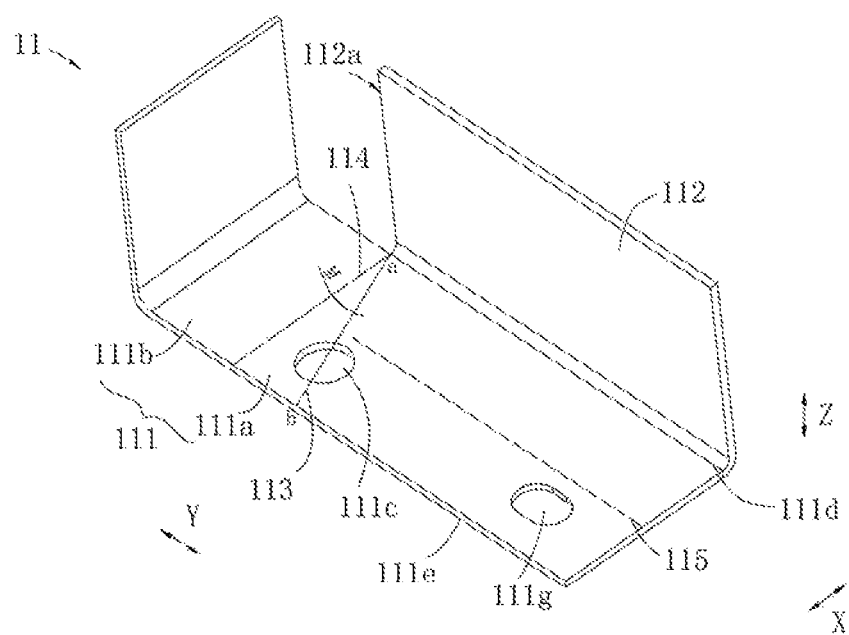
FIG. 3 shows a perspective view of an output electrode plate according to one embodiment of the present disclosure.
Figure 4:
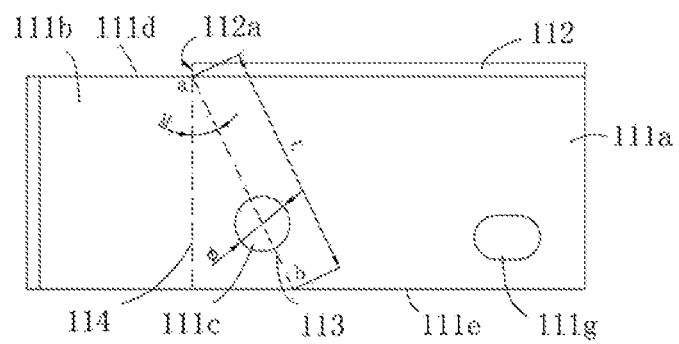
FIG. 4 shows a plan view of FIG. 3.

FIG. 3 shows a perspective view of an output electrode plate of one embodiment of the present disclosure, and FIG. 4 shows a plan view of the structure shown in FIG. 3. In one alternative embodiment, the battery module 100 preferably utilizes the output electrode plate 10 shown in FIGS. 3 and 4. As shown in FIGS. 3 and 4, the output electrode plate 10 according to an embodiment of the present disclosure includes a first metal plate 11 including a first region 111 and a second region 112 that are successively distributed in a first direction X. The first region 111 includes a first overcurrent portion 111a and a second overcurrent portion 111b that are successively distributed in a second direction Y and are connected with each other, wherein the second direction Y intersects with the first direction X, and the second region 112 is connected to the first region 111 through the first overcurrent portion 111a.

The first overcurrent portion 111a is provided with a through hole 111c which extends in the thickness direction Z thereof. The projection of the through hole 111c along the first direction X does not exceed the projection of the second region 112 along the first direction X in the second direction Y. A minimum overcurrent section of the first metal plate 11 is formed at the through hole 111c, such that the minimum overcurrent section is first fused when the current flowing through the first metal plate 11 is greater than a preset current. The overcurrent section refers to the area of the cross section in the direction of overcurrent, that is, the minimum section is the smallest section in the direction of overcurrent. Likewise, the minimum overcurrent section being first fused means particularly that the region on the first metal plate 111 that corresponds to the minimum overcurrent section is first fused.

When applied to the battery module 100, the output electrode plate 10 provided in this embodiment may be connected to the electrode lead 22 of the corresponding single cell 20 by welding or the like, thereby satisfying the input and output requirements of the power. Due to the provision of the through hole 111c in the first overcurrent portion 111a, the first metal plate 11 is formed with the minimum overcurrent section at the through hole 111c so that the minimum overcurrent section is first fused when the current flowing through the first metal plate 11 is greater than the preset current, and thereby ensuring the safety of the battery module 100.

Moreover, the projection of the through hole 111c along the first direction X does not exceed the projection of the second region 112 along the first direction X in the second direction Y. As compared to the case that the through hole 111c is provided in the second overcurrent portion 111b, since the through hole 111c is connected to the second region 112 in the first direction X, the strength of the output electrode plate 10 is higher and the output electrode plate 10 is not prone to break when the output electrode plate 10 is mounted or subjected to impact.

Meanwhile, the through hole 111c may be also provided to be connected to other member of the battery module 100 through an insulated fixing member 40, such that the strength of this region is ensured and this region will not break when subjected to impact or vibration, thereby better ensuring the safety and service life of the battery module 100. The insulated fixing member 40 may be made of an insulating material as a whole, or may be a member whose surface is subjected to insulation process. The insulated fixing member 40 may be directly connected to the spacer plate assembly 30, and in turn be indirectly connected to the single cell pack 20.

As one alternative implementation, the first region 111 of the first metal plate 11 may be a rectangular sheet structure, which may be a flat rectangular sheet structure extending along the plane. Of course, alternatively, in order to facilitate the output and input of the power of the battery module 100, one end of the first region 111 in the second direction Y is bent, and the bending direction intersects with, preferably perpendicular to, the second direction Y with each other.

The second region 112 may also utilize a rectangular sheet structure, and the intersection angle between the second region 112 and the first region 111 may be set as desired, preferably 90°. The second region 112 and the first region 111 may be connected by soldering. In order to ensure the stability of the output electrode plate 10 as a whole, the both preferably employ one integral structure. The length that the second region 112 extends in the second direction Y is smaller than that of the first region 111, and the specific size may be set according to the size requirement of the through hole 111c and the connection requirement of the electrode lead 22 of the single cell. The through hole 111c may have different shape, preferably the circular through hole 111c.

As one alternative implementation, the intersection line where the minimum overcurrent section intersects with the upper surface of the first overcurrent portion 111a of the first region 111 in the thickness direction Z is the first connection line 113, and the orthographic projection of the connection surface where the first overcurrent portion 111a connects to the upper surface of the second overcurrent portion 111b is the second connection line 114, the second connection line 114 intersects with the first connection line 113. With the above arrangement, the first connection line 113 is in the form of an oblique line, so that the output electrode plate 10 reduces the width of the output electrode plate 10 in the first direction X while satisfying the module output and the protection requirements of the module.

Meanwhile, the single cells 20 as the module output are generally the single cells 20 on both sides of the battery module 100. When the width of the output electrode plate 10 in the first direction X is too large, one solution is to extend the single cells 20 on both sides of the battery module 100 toward the direction of the adjacent single cell 20, which may affect the creepage distance, thereby causing a risk of short circuit. Another solution is to extend the single cells 20 toward the edge of the battery module 100, in this case, the single cell 20 on the furthest side needs to be displaced to connect the out electrode plate 10, which may affect the overall size of the battery module 100. In the output electrode plate 10 of the embodiment of the present disclosure, since the first connection line 113 is the oblique line, the influence on the battery module 100 may be minimized while the protection requirements of the battery module 100 is ensured.

As one alternative implementation, the angle M is formed by the first connection line 113 and the second connection line 114, which may be any value between 0° and 45°, such as 10°, 15°, 25°, 30°, 45°, or the like, preferably any value between 5° and 30°, more preferably any value between 15° and 25°. In the specific implementation, it may be set according to the fuse requirement, the fixed requirement and the overcurrent requirement under the normal condition.

As one alternative implementation, the first region 111 has a first edge 111d and a second edge 111e that are opposite in the first direction X, and the first connection line 113 has a first end point a and a second end point b that are opposite. The first end point a is located on the end surface 112a of the second region 112 in the second direction Y and is the intersection point of the first connection line 113 and the second connection line 114, and the second end point b is located on the second edge 111e, wherein the first connection line 113 passes through the through hole 111c. With the above arrangement, it is possible to better ensure the safety of the battery module in the event of an external short circuit.

Figure 5:
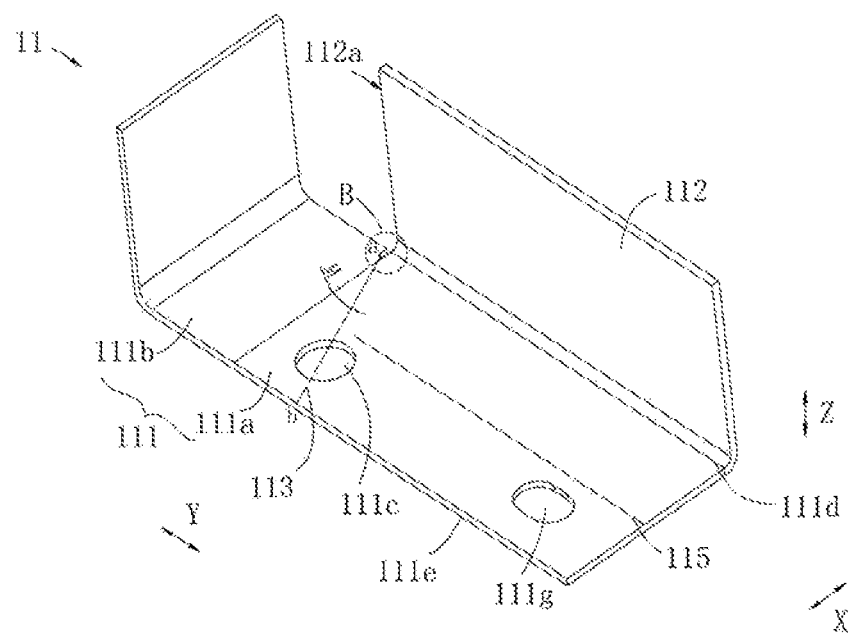
FIG. 5 shows a perspective view of an output electrode plate according to another embodiment of the present disclosure.
Figure 6:
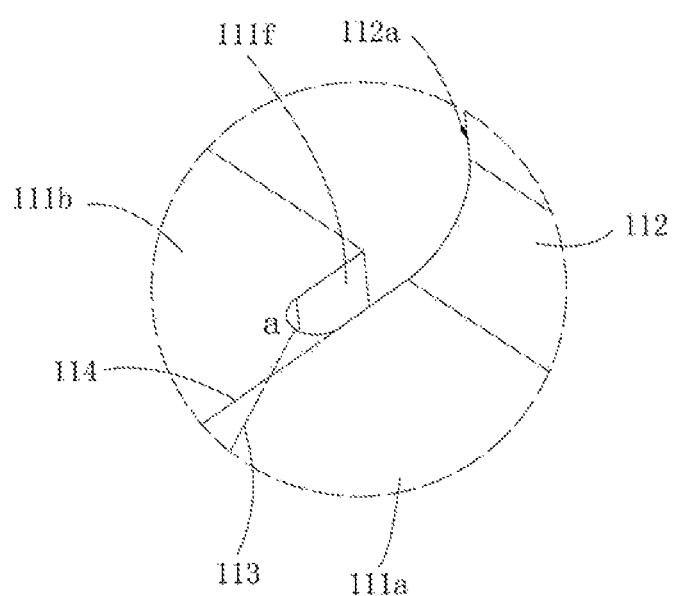
FIG. 6 shows an enlarged view of the portion B in FIG. 5.

FIG. 5 shows a perspective view of an output electrode plate 10 of another embodiment of the present disclosure, and FIG. 6 shows an enlarged view of the portion B in FIG. 5. Referring to FIG. 5 together with FIG. 6, likewise, the first region 111 of the output electrode plate 10 of this embodiment has a first edge 111d and a second edge 111e that are opposite in the first direction X, and the second overcurrent portion 111b is provided with a notch 111f which is recessed from the first edge 111d toward the second edge 111e. The second region 112 is connected to the first edge 111d and intersects with the first region 111, and at least part of the sidewall enclosing the notch 111f flushes with the end surface 112a of the second region 112 in the second direction Y.

The notch 111f may have different shape, such as semicircle, fan or other irregular shape. Of course, in one example, the shape of the notch 111f is preferably U-shaped, and the notch 111f passes through the second overcurrent portion 111b in the thickness direction Z of the first overcurrent portion 111a and is thus easy to process. With the provision of the notch 111f, the problem of stress concentration at the intersection of the first region 111 and the second region 112 of the first metal plate 11 can be solved, so that the output electrode plate 10 can also improve its own strength while the above requirements are satisfied.

Meanwhile, when the notch 111f is provided, the position of the first end point a of the first connection line 113 is not limited to the above embodiment. As shown in the example shown in FIGS. 5 and 6, the first end point a of the first connection line 113 is more preferably located on the sidewall of the notch 111f, and accordingly, the second end point b is located on the second edge 111e, and the first connection line 113 passes through the through hole 111c. With the above arrangement, the notch 111f may also in cooperation with the through hole 111c, further reduce the actual section size of the minimum overcurrent section while ensuring the strength requirements of the output electrode plate 10. When the external short circuit occurs in the battery module 100, the minimum overcurrent section of the output electrode plate 10 is more prone to be fused, thereby providing safety of the battery module 100.

As one alternative implementation, the first connection line 113 has a length L, which is determined based on the characteristic parameter of the first metal plate 11, the time when the preset current flows through the first metal plate 11, and the preset diameter of the through hole 111c.

Alternatively, the characteristic parameter of the first metal plate 11 is determined based on the constant coefficient of the first metal plate 11, the preset current flowing through the first metal plate 11, and the thickness of the first region 111 of the first metal plate 11. In the specific implementation, the length L of the first connection line 113 may be determined based on a relation (1):

$$L \le \frac{IK}{d}\sqrt{t} + \phi \qquad (1)$$

wherein, I is the preset current flowing through the first metal plate 11, K is the constant coefficient of the first metal plate 11, d is the thickness of the first region 111 of the first metal plate 11, and t is the time when the current flows through the first metal plate 11, φ is the preset diameter of the through hole 111c.

The constant coefficient K of the first metal plate 11 may be obtained based on the metal conductivity, the specific heat capacity, the metal mass density, and the metal melting point of the first metal plate 11. Wherein, the constant coefficient K of the first metal plate 11 may be obtained using the formula:

$$K = \sqrt{\frac{\rho_{conductivity}}{C\rho_{density}A}} \qquad (2)$$

wherein, $\rho_{conductivity}$ is the metal conductivity of the first metal plate 11, C is the specific heat capacity of the first metal plate 11, and $\rho_{density}$ is the metal mass density of the first metal plate 11, and A is the metal melting point of the first metal plate 11.

With the above arrangement, the relative position between the through hole 111c and the notch 111f can be more accurately determined and processed, thereby better ensuring the safety of the battery module.

In the example of the output electrode plate 10 being a copper electrode plate and the thickness of the output electrode plate 10 being limited to 0.85 mm, and in the case that the first metal plate 11 is fused when the battery module 100 has an external short circuit, the current of the external short circuit is 8700 A, and the time when the current of the external short circuit flows through the first metal plate 11 is 0.4 s, it may be calculated that the difference between the length L of the first connection line 113 and the diameter of the through hole 111c is at most 14 mm.

When it is desired to provide the notch 111f and the through hole 111c on the output electrode plate 10 during processing the output electrode plate 10, one of the notch 111f or the through hole 111c may be previously processed, for example, the notch 111f is previously processed, and after the process is finished, the first connection line 113 is then determined according to the diameter of the desirable hole 111c. The first end point a of the first connection line 113 is determined to be located on the wall surface of the notch 111f and the first connection line 113 is provided such that the second end point b of the first connection line 113 is located on the second edge 111e of the first metal plate 11. Then, one point on the first connection line 113 is set as a hole center of the through hole 111c, and the through hole 111c is processed according to the diameter of the through hole 111c. As such, it is easy to process while ensuring that the first metal plate 11 may be fused strictly within a predetermined time according to the material, thickness and the like of the metal plate 11.

Such arrangement is illustrated only when the notch 111f being previously processed is as an example. Of course, the through hole 111c may be processed previously, which may also satisfy positioning requirement of the notch 111f and the through hole 111c. The length L of the first connection line 113 may be adjusted as required, as long as the functional relationship (1) may be satisfied. In the specific implementation, in additional to satisfying the functional relationship (1), the minimum value of the length L of the first connection line 113 further preferably is in consideration of the operation current and operation temperature of the output electrode plate 10 when applied into the battery module 100, so as to ensure safe operation of the battery module 100 under normal operation state.

Since it is desirable that the output electrode plate 10 is connected to other corresponding component in the battery module through the insulated fixing member 40, in order to better ensure the strength of the connection between the output electrode plate 10 and the corresponding component such as the spacer plate assembly 30 and in order to better limit the freedom degree of the output electrode plate 10, it is preferable that the first overcurrent portion 111a of the first region 111 is further provided with a limiting through hole 111g in the thickness direction thereof Z, and the limiting through hole 111g is provided apart from the through hole 111c. The limiting through hole 111g may be a circular hole, a waist hole or the like, and may be used for other fasteners to pass through, so that the connection strength between the output electrode plate 10 and the corresponding component is higher, thereby further ensuring the service life and the safety of the battery module 100.

As one alternative embodiment, the through hole 111c is provided away from the second region 112 and is offset in the first direction X from the center line 115 of the first overcurrent portion 111a in the first direction X. Since the first metal plate 11 of the output electrode plate 10 includes the second region 112 and is connected to the electrode lead 22 of the corresponding single cell 20, when the battery module 100 is charged or discharged, the path of the current includes the path from the connection position of the second region 112 with the electrode lead 22 to the first region 111, or the path from the first region 111 to the connection position of the second region 112 with the electrode lead 22. The current generally flows within the shortest path which the current may flow from the inflow end and the outflow end, so the current is concentrated on the position near the second region 112.

By providing the through hole 111c away from the second region 112 and offset in the first direction X from the center line 115 of the first overcurrent portion 111a in the first direction X, the through hole 111c may be away from the second region 112, thereby preventing heat accumulation due to excessive local heat during normal use of the output electrode plate 10 from affecting the performance of the single cell 20. Meanwhile, such arrangement may also provide an operation space for the mounting of the insulated fixing member 40 provided in the through hole 111c.

Figure 7:
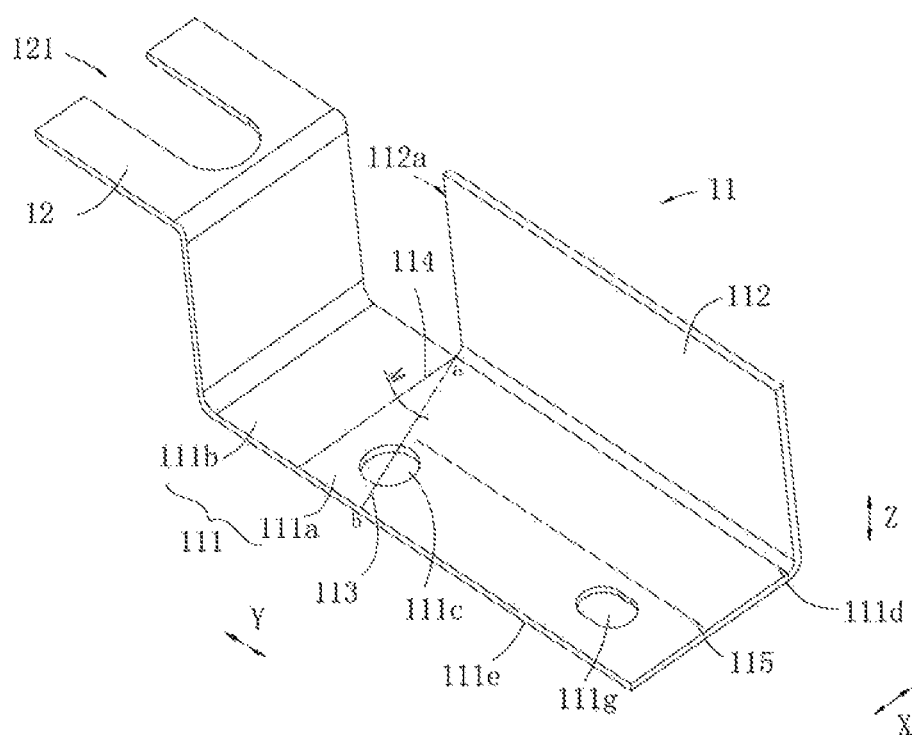
FIG. 7 shows a perspective view of an output electrode plate according to a further embodiment of the present disclosure.

FIG. 7 shows a structural view of an output electrode plate 10 according to a further embodiment of the present disclosure. As shown in FIG. 7, as one alternative implementation, the output electrode plate 10 further includes a second metal plate 12 connected to the first metal plate 11, and the second metal plate 12 is provided with a connection port 121, which is used for electrical connection between battery modules. Generally, there is a need for a transition connection via an electrical connection plate for connecting one battery module 100 with another battery module 100 electrically. The electrical connection plate and the second metal plate 12 are laminated and connected with each other through a connection member provided at the connection port 121. Therefore, the minimum overcurrent section of the second metal plate 12 on which the connection port 121 is provided may be larger than the minimum overcurrent section of the first metal plate 11, and may of course be smaller than the minimum overcurrent section of the first metal plate 11. Due to the electrical connection plate, it can still ensure that the minimum overcurrent section of the first metal plate 11 is first fused, thereby ensuring the safety of the battery module 100, when the external short circuit occurs in the battery module 100.

It may be understood that the shape of the through hole 111c in the above embodiments is illustrated by taking the circular hole as an example. This is a preferred embodiment, but is not limited thereto. In some other example, the through hole 111c may also be a square hole or a polygonal hole or the like, as long as it can satisfy the fixing and safety protection requirements for the output electrode plate 10.

It may be understood that the battery module of the above embodiments is illustrated as the example that the output electrode plate 10 is provided on the spacer plate assembly 30 through the through hole 111c and the insulated fixing member 40. This is an alternative implementation, but the disclosure is not limited thereto. In some alternative examples, when the battery module 100 does not have the spacer plate assembly 30 or even when the battery module 100 has the spacer plate assembly 30, the output pole 10 may also be directly and fixedly connected to the single cell pack 20 through the through hole 111c and the insulated fixing member 40, that is, the insulating fixing member 40 is directly connected to the single cell pack 20, and particularly may be fixedly connected to the fixing frame 21 of the single cell pack 20. At this time, the fixing frame 21 may be made of insulating material, as long as the safety protection requirement of the battery module 100 at its own level may be satisfied, and meantime the input and output requirements of the power may be ensured. Moreover, the battery module 100 is not limited to a battery module that is a pouch-type, and may be other type of battery module 100, which may also employ the output electrode plate 10 of the embodiment of the present disclosure.

Therefore, the output electrode plate 10 and the battery module 100 provided in the embodiments of the present disclosure can not only satisfy the output and input requirements of the power of the battery module 100 but also ensure the safety of the battery system at the module level, and is thus easy to promote.

Although the present disclosure has been described with reference to the above preferred embodiments, various modifications may be made thereto and the components therein may be replaced with equivalents without departing from the scope of the disclosure. In particular, each technical feature mentioned in the various embodiments may be combined in any manner as long as there is no structural conflict. The present disclosure is not limited to the specific embodiments disclosed herein, but includes all technical solutions falling within the scope of the claims.

What is claimed is:

1. A battery module, comprising:
    a single cell pack, comprising a plurality of single cells that are electrically connected with each other; and
    an output electrode plate electrically connected to a single cell of the single cell pack which is used as output module, wherein the output electrode plate comprises a first metal plate;
    the first metal plate includes a first region and a second region that are successively distributed in a first direction, and the first direction is a width direction of the output electrode plate;
    the first region includes a first overcurrent portion and a second overcurrent portion, and the first overcurrent portion and the second overcurrent portion are successively distributed in a second direction and are connected with each other, wherein the second direction intersects with the first direction, and the second region is connected to the first region through the first overcurrent portion;
    wherein the first overcurrent portion is provided with a through hole which extends in a thickness direction thereof, and a projection of the through hole along the first direction does not exceed a projection of the second region along the first direction in the second direction, and the first metal plate comprises a minimum overcurrent section which passes through the through hole, such that the minimum overcurrent section is first fused when a current flowing through the first metal plate is greater than a preset current;
    wherein the second region is configured to be connected to an electrode lead of the single cell; and
    wherein an extending length of the second region in the second direction is smaller than an extending length of the first region in the second direction.

2. The battery module according to claim 1, wherein an intersection line where the minimum overcurrent section intersects with an upper surface of the first region in the thickness direction is a first connection line, and an orthographic projection on the upper surface of a connection surface where the first overcurrent portion connects to the second overcurrent portion is a second connection line, wherein the second connection line intersects with the first connection line.

3. The battery module according to claim 2, wherein an angle M is formed by the first connection line and the second connection line, wherein 0°<M<45°.

4. The battery module according to claim 2, wherein the first region has a first edge and a second edge that are opposite in the first direction, the second overcurrent portion is provided with a notch which is recessed from the first edge toward the second edge, the second region is connected to the first edge and intersects with the first region, and at last part of a sidewall enclosing the notch flushes with an end surface of the second region in the second direction.

5. The battery module according to claim 4, wherein the first connection line has a first end point a and a second end point b that are opposite, the first end point a is located on the sidewall of the notch, the second end point b is located on the second edge, and the first connection line passes through the through hole.

6. The battery module according to claim 2, wherein the first region has a first edge and a second edge that are opposite in the first direction, and the first connection line has a first end point a and a second end point b that are opposite, the first end point a is located on an end surface of the second region in the second direction and is an intersection point of the first connection line and the second connection line, the second end point b is located on the second edge, and the first connection line passes through the through hole.

7. The battery module according to claim 5, wherein the first connection line has a length L, and the length is determined based on a characteristic parameter of the first metal plate, a time when the preset current flows through the first metal plate, and a preset diameter of the through hole.

8. The battery module according to claim 7, wherein the characteristic parameter of the first metal plate is determined based on a constant coefficient of the first metal plate, the preset current flowing through the first metal plate, and a thickness of the first region of the first metal plate.

9. The battery module according to claim 8, wherein the length of the first connection line is determined based on a relation:

$$L \leq \frac{IK}{d}\sqrt{t} + \varphi$$

wherein I is the preset current flowing through the first metal plate, K is the constant coefficient of the first metal plate, d is the thickness of the first region of the first metal plate, and t is the time when the current flows through the first metal plate, φ is the preset diameter of the through hole.

10. The battery module according to claim 9, wherein the constant coefficient of the first metal plate is obtained based on a metal conductivity, a specific heat capacity, a mass metal density and a metal melting point of the first metal plate.

11. The battery module according to claim 10, wherein the constant coefficient of the first metal plate is obtained using the formula:

$$K = \sqrt{\frac{\rho_{conductivity}}{C\rho_{density}A}}$$

wherein, $\rho_{conductivity}$ is the metal conductivity of the first metal plate, C is the specific heat capacity of the first metal plate, and $\rho_{density}$ is the metal mass density of the first metal plate, and A is the metal melting point of the first metal plate.

12. The battery module according to claim 6, wherein the first connection line has a length L, and the length is determined based on a characteristic parameter of the first metal plate, a time when the preset current flows through the first metal plate, and a preset diameter of the through hole.

13. The battery module according to claim 12, wherein the characteristic parameter of the first metal plate is determined based on a constant coefficient of the first metal plate, the preset current flowing through the first metal plate, and a thickness of the first region of the first metal plate.

14. The battery module according to claim 13, wherein the length of the first connection line is determined based on a relation:

$$L \leq \frac{IK}{d}\sqrt{t} + \varphi$$

wherein I is the preset current flowing through the first metal plate, K is the constant coefficient of the first metal plate, d is the thickness of the first region of the first metal plate, and t is the time when the current flows through the first metal plate, φ is the preset diameter of the through hole.

15. The battery module according to claim 14, wherein the constant coefficient of the first metal plate is obtained based on a metal conductivity, a specific heat capacity, a mass metal density and a metal melting point of the first metal plate.

16. The battery module according to claim 15, wherein the constant coefficient of the first metal plate is obtained using the formula:

$$K = \sqrt{\frac{\rho_{conductivity}}{C\rho_{density}A}}$$

wherein, $\rho_{conductivity}$ is the metal conductivity of the first metal plate, C is the specific heat capacity of the first metal plate, and $\rho_{density}$ is the metal mass density of the first metal plate, and A is the metal melting point of the first metal plate.

17. The battery module according to claim 1, wherein the through hole is provided away from the second region and is offset in the first direction from a center line of the first overcurrent portion in the first direction.

18. The battery module according to claim 1, wherein further comprising a second metal plate that is connected to the first metal plate of the output electrode plate, the second metal plate is provided with a connection port for electrical connection between the battery module and a further battery module.

19. An output electrode plate for a battery module, wherein the output electrode plate comprises a first metal plate;
the first metal plate includes a first region and a second region that are successively distributed in a first direction, and the first direction is a width direction of the output electrode plate;
the first region includes a first overcurrent portion and a second overcurrent portion, and the first overcurrent portion and the second overcurrent portion are successively distributed in a second direction and are connected with each other, wherein the second direction intersects with the first direction, and the second region is connected to the first region through the first overcurrent portion;
wherein the first overcurrent portion is provided with a through hole which extends in a thickness direction thereof, and a projection of the through hole along the first direction does not exceed a projection of the second region along the first direction in the second direction, and the first metal plate comprises a minimum overcurrent section which passes through the through hole, such that the minimum overcurrent section is first fused when a current flowing through the first metal plate is greater than a preset current;
wherein the second region is configured to be connected to an electrode lead of a single cell;
wherein an extending length of the second region in the second direction is smaller than an extending length of the first region in the second direction;
wherein an intersection line where the minimum overcurrent section intersects with an upper surface of the first region in the thickness direction is a first connection line, and an orthographic projection on the upper surface of a connection surface where the first overcurrent portion connects to the second overcurrent portion is a second connection line, wherein the second connection line intersects with the first connection line; and wherein the first region has a first edge and a second edge that are opposite in the first direction, the second overcurrent portion is provided with a notch which is recessed from the first edge toward the second edge, the second region is connected to the first edge and intersects with the first region, and at least part of a sidewall enclosing the notch flushes with an end surface of the second region in the second direction.

20. An output electrode plate for a battery module, wherein the output electrode plate comprises a first metal plate;

the first metal plate includes a first region and a second region that are successively distributed in a first direction, and the first direction is a width direction of the output electrode plate;

the first region includes a first overcurrent portion and a second overcurrent portion, and the first overcurrent portion and the second overcurrent portion are successively distributed in a second direction and are connected with each other, wherein the second direction intersects with the first direction, and the second region is connected to the first region through the first overcurrent portion;

wherein the first overcurrent portion is provided with a through hole which extends in a thickness direction thereof, and a projection of the through hole along the first direction does not exceed a projection of the second region along the first direction in the second direction, and the first metal plate comprises a minimum overcurrent section which passes through the through hole, such that the minimum overcurrent section is first fused when a current flowing through the first metal plate is greater than a preset current;

wherein the second region is configured to be connected to an electrode lead of a single cell;

wherein an extending length of the second region in the second direction is smaller than an extending length of the first region in the second direction; and wherein the through hole is provided away from the second region and is offset in the first direction from a center line of the first overcurrent portion in the first direction.

* * * * *